April 29, 1952  J. J. RAVERS, JR  2,595,100
HITCH
Filed March 29, 1948  3 Sheets-Sheet 2
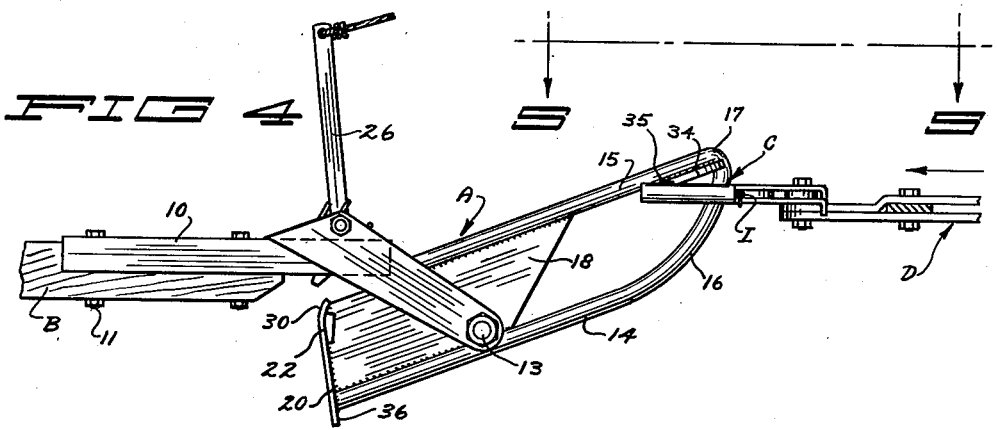
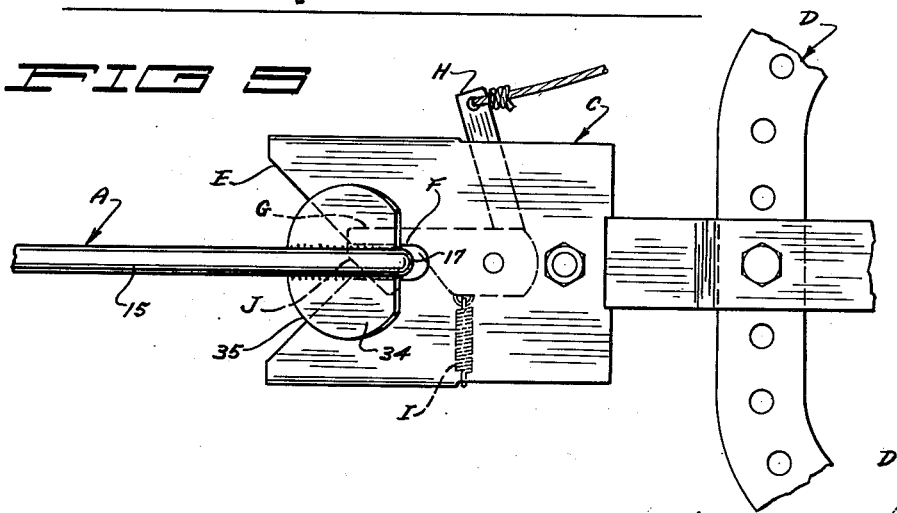
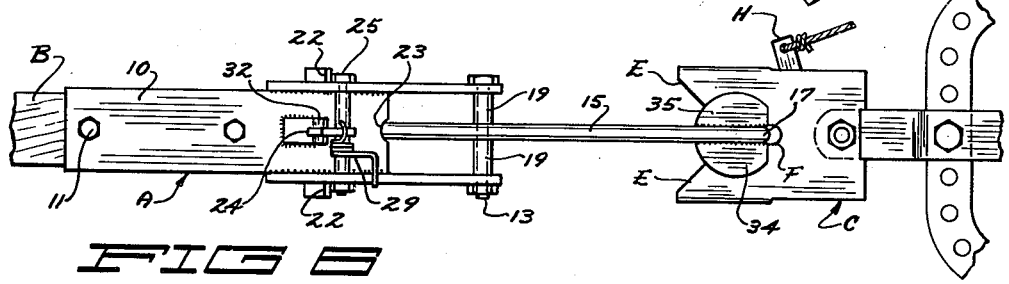
Inventor
JERRY J. RAVERS JR.

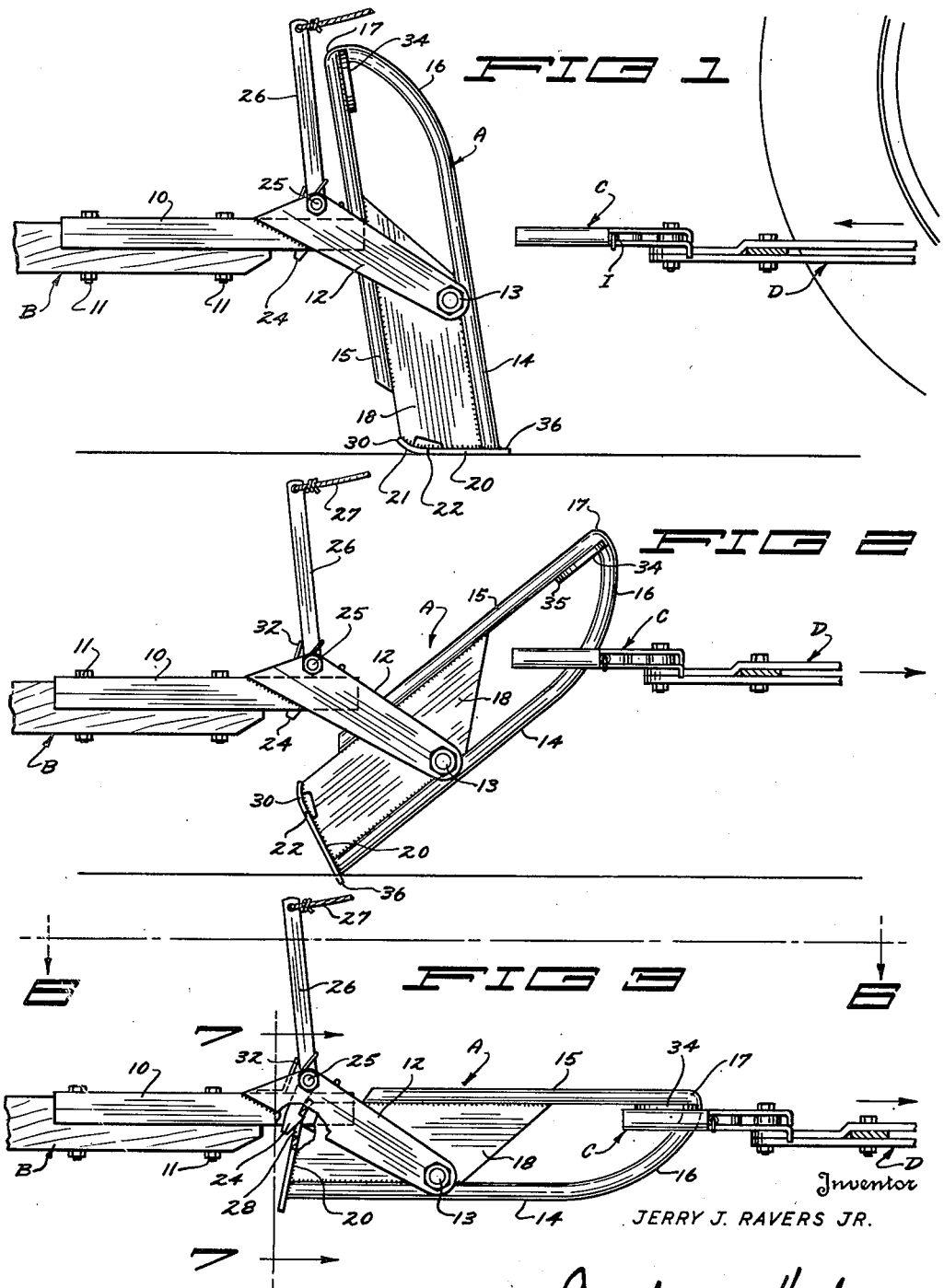

April 29, 1952   J. J. RAVERS, JR   2,595,100
HITCH
Filed March 29, 1948   3 Sheets-Sheet 3
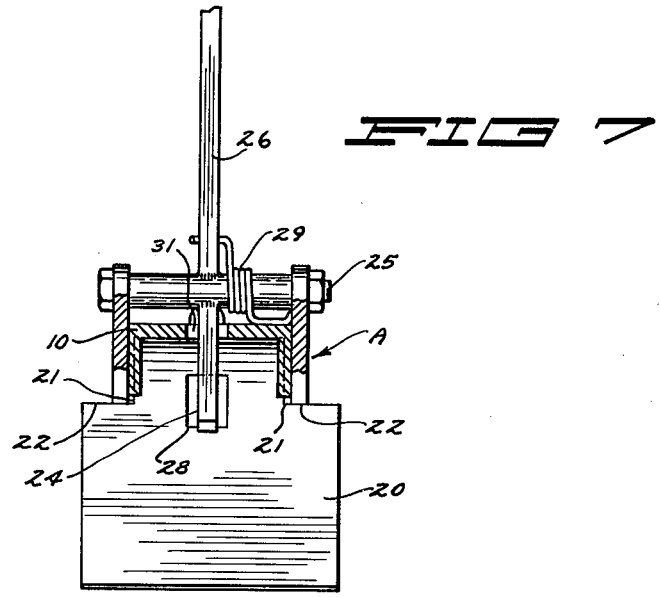
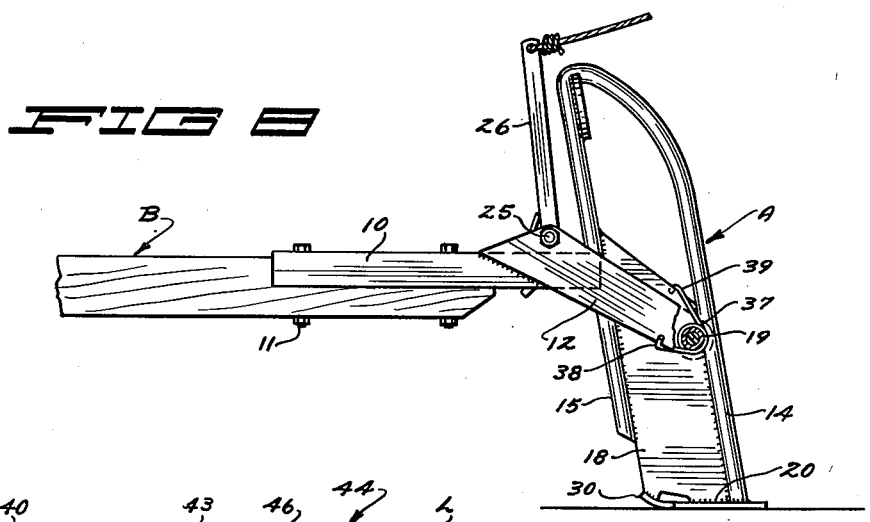
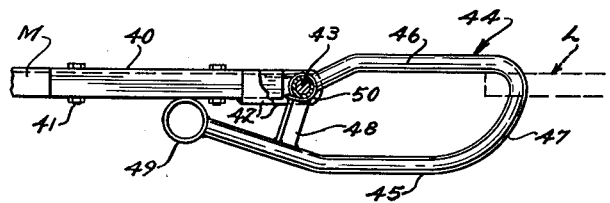
Inventor
JERRY J. RAVERS JR.
By Carlsen + Hazh Patented Apr. 29, 1952

2,595,100

UNITED STATES PATENT OFFICE.

2,595,100

HITCH

Jerry J. Ravers, Jr., Amiret, Minn., assignor of one-third to Willard D. Knox and one-third to Harry K. Nyberg, both of Tracy, Minn.

Application March 29, 1948, Serial No. 17,632

8 Claims. (Cl. 280—33.44)

My invention relates to improvements in hitches for making draft connection from a tractor vehicle to a trailing vehicle or device. While my improved hitch is useful in several fields, its chief use is the coupling of tractors to farm implements and will be so described.

The primary object of my invention is to provide a hitch mechanism whereby a tractor may be coupled to or uncoupled from an implement without requiring that the operator place himself in a dangerous position where he may be injured as now all too frequently happens.

Another object is to provide a hitch mechanism which, when not actually coupling an implement to the tractor, assumes a position in which it supports the front end or draft tongue of the implement above the ground and in position for coupling up merely by backing the tractor up to the implement. In furtherance of this object my improved hitch is so constructed as to afford a considerable latitude in hitching height, or in other words, it will properly engage and couple up even if the ground is very irregular or the hitch or draw bar connection varies considerably in height upon different tractors. Then there is no occasion for the operator to have to lift the implement tongue with possible injury to himself in the process.

Another object of my invention is to provide a hitch mechanism such that fore and aft play between the tractor and implement, to the extent of a foot or two, is provided for without the two becoming uncoupled. This feature is of particular advantage should the implement become mired in wet ground in that the tractor may be backed up for a new start as will be readily understood.

Still another object of my invention is to provide a hitch mechanism particularly suitable for use in connection with the conventional strain release "spring" hitches on the tractor which release the implement if it strikes an obstruction, my hitch for this use embodying means to snap it, when released, into a position for supporting the implement tongue ready for recoupling when the tractor is backed up again.

A further object is to provide a hitch which will act as a stand for the front end of an implement tongue, or pole as it is sometimes called.

These and other more detailed and specific objects will be disclosed in the course of the following specification, reference being had to the accompanying drawings, in which—

Fig. 1 is a side elevation of my improved hitch mechanism coupled to an implement tongue and showing a tractor draw bar and hitch or coupling, the hitch mechanism being uncoupled and supporting the implement tongue above ground.

Fig. 2 is a similar view but showing the parts coupled up and moving toward position for pulling the implement.

Fig. 3 is a similar view showing the hitch in fully coupled condition, certain parts being broken away and in section in this view.

Fig. 4 is another similar side elevation but illustrating the start of the operation of uncoupling the implement.

Fig. 5 is an enlarged fragmentary plan view, showing the parts along the line 5—5 in Fig. 4.

Fig. 6 is a plan view of the element appearing in Figs. 1-4, along the line 6—6 in Fig. 3.

Fig. 7 is an enlarged cross sectional view along the line 7—7 in Fig. 3.

Fig. 8 is a side view, partially in section of a modified hitch mechanism particularly designed for use with conventional strain release draw bar coupling.

Fig. 9 is a side view, partially broken away and in section, of a hitch mechanism particularly designed for use on plows in connection with a so-called spring hitch on the tractor.

Referring now more particularly, and by reference characters to Figs. 1-7 of the drawings, A designates generally my improved hitch mechanism adapted for mounting on the tongue B of an implement or other trailing device, and for connection through a conventional tractor hitch or draft coupling C to the draw bar D of a tractor, only the extreme rear part of which is shown. The coupling C, as it will be hereinafter termed to avoid confusion with the hitch of my invention, is of the snap-on type and has a rearwardly flaring mouth E (Fig. 5) communicating with a throat or notch F across which, rearwardly of the forward end thereof, there normally projects a hook G. This hook may be actuated from the tractor through a rope connection to an arm H to swing the hook clear of the throat F and when released a spring I returns the hook to position. The hook G has a cam surface J on its end and the arrangement is, as usual, such that the coupling may be forced back over the hitch pin or clevis pin, which will cam its way past the hook and the hook will then snap in place to complete the draft connection, which connection may be released by a pull on the arm H to swing the hook out of the way.

The hitch mechanism A comprises a mounting member or bracket in the form of an inverted channel 10 adapted to be placed astraddle the implement tongue B and secured thereto by bolts 11 with the channel extending forwardly some distance beyond the end of the tongue. Mounting arms 12 are welded to the sides of the channel 10 and extend downwardly and forwardly therefrom, carrying at their forward ends a cross bolt 13 which acts as a transverse and horizontal pivot support for the main element of my hitch. This main element is a swinging hitch member and comprises a length of heavy rod bent to a sled runner shape having spaced legs 14 and 15, one of which curves first gradually at 16, and then bends sharply at 17 where it meets the other. A plate or web 18 is welded between the opposite ends of the legs 14 and 15 and a tubular bearing 19 (Fig. 6) is welded to and through this plate to rotatably fit upon the cross bolt 13 between the arms 12. Another plate 20 is welded to the extremity of the leg 14 and to the adjacent edge of the plate 18 and the latter plate is wider than the distance between the arms 12 except at the corners 21 which are notched out, narrowing this end of the plate to a dimension less than the distance between the arms and forming laterally projecting stops 22 best shown in Fig. 7.

The foregoing arrangement is such that the swinging hitch may swing in a vertical, longitudinal plane about the axis of the bolt 13 from a pulling or operative position at which the hitch extends forwardly and horizontally (Fig. 3) from the implement tongue B substantially in alignment therewith, upwardly and rearwardly at its forward end to a generally upright starting or inoperative position (Fig. 1), and return. This hitch member is limited in its slightly more than ninety degree motion by the contact of the stops 22 with the lower edges of the arms 12 in the operative position of Fig. 3, and by contact of the leg 15 with the notch 23 (Fig. 6) in the forward end of the channel in the upright or inoperative position of Fig. 1.

Additionally, the swinging hitch member is latched in its operative position by a latch 24 which is pivoted on a cross bolt 25 joining the arms 12 above the channel 10 and having an upward lever extension 26 to which a rope 27 may be connected for operating the latch from the tractor. The latch 24 has a hooked end adapted to upwardly engage in a slot 28 in the plate 20 as the hitch member reaches its forwardly extending position, and a torsional coil spring 29 is provided to so engage the latch. As the hitch member swings upwardly at its rear end toward its latched position a curved edge 30 of the plate 20 engages and cams the latch 24 away until the slot 28 reaches position for engagement with the latch hook. The channel 10 is, of course, suitably slotted (31 in Fig. 7) to clear the latch 24 and swinging movement of the latch, when not in use, under influence of the spring 29 is limited by a stop 32.

In the operation of the hitch mechanism, the swinging hitch member normally stands in the position of Fig. 1 and the plate 20 then acts as a rest or foot plate supporting the weight of the front end of the implement and holding the tongue B some distance above the ground. It will be noted that in such position the swinging hitch member inclines upwardly and rearwardly and thus stands beyond dead center so that it will have no tendency to flop over and allow the tongue to fall. The plate 20 is purposely made wide enough to provide a firm footing even on wet ground. Now to couple the tractor to the implement the tractor is backed up so that the rearwardly flaring mouth E of the coupling C guides the notch or throat F into engagement with the leg 14 and when this action is completed the latch G will snap over the leg 14. A loose, sliding connection (Fig. 5) is thus made between the coupling C and this leg 14 of the hitch and attention is called to the fact that, since this connection may be made any place along a considerable length of the generally upright leg 14, above the plate 18, a considerable latitude in hitching elevation is possible to compensate for different coupling heights above the ground.

The tractor is now started forward and the pull of the coupling C, being above the hitch pivot 13, the hitch member will start to swing forwardly and downwardly at its previously upper end as seen in Fig. 2 and at the same time the coupling C will slide forwardly up the curved end 16 of the leg 14. This action continues under the pull of the tractor until the hitch member straightens out to the pulling position of Fig. 3 whereat the coupling C reaches the junction of the legs 14—15 and the latch 24 snaps into place to lock the hitch. The hitch now transmits the draft force to the implement as effectively as the usual arrangement, permitting turning and steering movement without difficulty, and it will be noted that in coupling up there has been no necessity for the operator to lift or tug upon the tongue or even to place himself in a dangerous position between the tractor and implement.

To uncouple, the latch 24 is disengaged by a pull on the rope 27 and the tractor is started back causing the coupling C to slide downward and rearwardly along the curve 16 of the hitch leg. As this occurs the hitch member starts to swing, as seen in Fig. 4, back toward its normal or upright position and this motion is initiated and assisted by a cam plate 34 which is welded to underside of the leg 15 at the bend 17 and rests upon the coupling C when the tractor is pulling. The rear edge 35 of the cam plate is curved as shown in Figs. 5 and 6 and as the rearward motion of the coupling starts, as just described, the curved edge will coact with the diverging sides of the mouth E of the coupling to cause the forward end of the hitch member to start to swing upwardly. As this motion continues the exposed edge 36 of the rest plate 20 will strike and toe into the ground forming a bearing about which the hitch member will be swung back to its upright implement supporting position by the tractor. As this point is reached, the coupling C is released and the tractor may then move away having left the implement uncoupled, but in position for recoupling, all again without work or danger on the part of the operator.

An additional feature of my invention resides in the fact that the tractor may be backed up a foot or two with respect to the implement to make a fresh start when stuck in soft ground without uncoupling from the implement, the swinging hitch member permitting this very desirable play in a manner which should be obvious.

Referring now to Fig. 8 the hitch there shown is identical with that previously described with the exception that a strong torsional coil spring 37 (or one at each side) is placed around the bearing 19 with its ends 38 and 39 engaging one of the arms 12 and the edge of the plate 18 so as to urge the hitch member toward its upright position. This arrangement is for use in connection with a conventional strain release or "spring" hitch type of coupling (not shown) on the tractor, instead of the coupling C, so that a plow, for example, will cut loose from the tractor when it strikes an obstruction. In such case, the spring 37 will snap the hitch member to its starting position, as shown in this view, ready for recoupling.

In Fig. 9 I show a hitch mechanism particularly for use upon plows and in connection with a conventional spring or strain release hitch on the tractor, the latter being illustrated diagrammatically at L and the plow tongue or pole at M. In this construction, the hitch includes a channel-shaped mounting bracket 40 bolted at 41 to plow pole M and arms 42 are welded to and extended straight forwardly from the bracket. The forward ends of the arms 42 are apertured to receive a transversely extending pivot pin 43. The swingable hitch member is designated generally at 44 and comprises here very simply a sled runner shaped formation from a single length of heavy rod forming spaced legs 45 and 46 with a curved forward portion 47 joining the legs. At the rear the leg 46 is welded to a tubular bearing rotatably mounted on the aforesaid pin 43 and the other leg 45 is joined to the bearing by a short length of T-iron brace 48 welded in place. The leg 45 extends rearwardly beyond the brace 48 at its extremity there is welded a transversely extending length of tubing 49 to act as a shoe. At least one heavy torsional coil spring 50 is placed around the bearing and pin 43 with its ends engaged with the bracket 40 and brace 48 to normally urge the hitch member 44 in a counterclockwise direction as viewed in the drawing.

When the tractor hitch L is engaged with the hitch member 44 it will be noted that the pull is in line, horizontally, with the pivot 43 and thus no latch such as previously described is needed to hold the hitch member in its pulling position. When the hitch L releases under strain the hitch member 44 will snap to its generally upright, but "leaning back" position under influence of the spring 50 and the foot 49 will then engage the ground as the tongue or pole M drops, acting as a stand for the pole. Contact of the hitch leg 46 with the forward end of the bracket 40 will limit the movement of the hitch member by the spring as will be readily understood.

It is understood that suitable modifications may be made in the structure as disclosed, provided such modifications come within the spirit and scope of the appended claims.

Having now therefore fully illustrated and described my invention, what I claim to be new and desire to protect by Letters Patent is:

1. A hitch mechanism of the character described for making a draft connection between a tractor having a draft coupling and an implement having a draft tongue, comprising a hitch member swingably connected to the implement and normally standing in a generally upright position resting at one end on the ground to support the implement tongue and the hitch member having a portion for engagement by the coupling as the tractor is backed up to the implement, and the coupling engaging portion of the hitch member in the said upright position thereof being vertically extended and elongated to thereby compensate for varying heights of the coupling.

2. A hitch mechanism of the character described for making a draft connection between a tractor having a draft coupling and an implement having a draft tongue, comprising a hitch member swingably connected to the implement and normally standing in a generally upright position resting at one end on the ground to support the implement tongue and the hitch member having a portion for engagement by the coupling as the tractor is backed up to the implement, and the coupling engaging portion of the hitch member comprising an elongated slender element which in the said upright position of the member stands in an erect position to accept the coupling at varying heights at which it may be above the ground.

3. A hitch mechanism of the character described for making a draft connection between a tractor having a draft coupling and an implement having a draft tongue, comprising a hitch member swingably connected to the implement and normally standing in a generally upright position resting at one end on the ground to support the implement tongue and having a foot plate on the ground engaging end, the said hitch member including a sled runner shaped member for engagement by the coupling and operative as the coupling is engaged and the tractor started forward to enable the coupling to slip along and pull out the hitch member to a forwardly extending position, and the shape of the coupling engaging member being further such that backing of the tractor will swing the hitch member toward and back to its upright starting position.

4. A hitch mechanism of the character described for making a draft connection between a tractor having a draft coupling and an implement having a draft tongue, comprising a hitch member swingably connected to the implement and normally standing in a generally upright position resting at one end on the ground to support the implement tongue and having a foot plate on the ground engaging end, the said hitch member including a sled runner shaped member for engagement by the coupling and operative as the coupling is engaged and the tractor started forward to enable the coupling to slip along and pull out the hitch member to a forwardly extending position, the shape of the coupling engaging member being further such that backing of the tractor will swing the hitch member toward and back to its upright starting position, and a cam member on the forward end of the hitch member for engaging the coupling as the tractor moves rearwardly and assisting in tilting the hitch member back toward its upright position.

5. A hitch mechanism for connecting a tractor draw bar coupling to an implement tongue, comprising in combination, a bracket secured to the tongue, a hitch member pivoted to the bracket and supported for swinging movements with respect to the implement from a starting position at which it inclines upwardly and rearwardly to a forwardly extending operative position, a foot plate on one end of the hitch member for engaging the ground in said starting position to thereby support the implement tongue, the said hitch member having a coupling engaging leg which in the operative position of the member extends forwardly and curves upwardly whereby rearward movement of the coupling along the curve will urge the forward end of the member upwardly to return it to starting position, and releasable latch means for holding the hitch member in its operative position.

6. A hitch mechanism for connecting a tractor draft coupling to a trailing implement, comprising in combination, a mounting member on the implement and having a pivot, a hitch member attached by the pivot to the implement and supported by said pivot for swinging movements to and from a normal position at which it extends upwardly and rearwardly to a forwardly extending pulling position, means on the hitch member for engaging the ground in said normal position whereby the hitch member itself will act as a support for the implement, the said hitch member having means forming a sled runner shaped surface for engagement by the said draft coupling, and said surface having a straight portion standing in a substantially upright position in the normal position of the hitch member and above the level of the said pivot whereby engagement of the draft coupling and a forward pull thereon will pull out the hitch member to its pulling position, and said surface terminating in an upwardly curving portion at its forward end in the pulling position whereby reversed movement of the draft coupling will swing the hitch member back to its normal position.

7. A hitch mechanism for connecting a tractor draft coupling to a trailing implement, comprising in combination, a mounting member on the implement and having a pivot, a hitch member attached by the pivot to the implement and supported by said pivot for swinging movements to and from a normal position at which it extends upwardly and rearwardly to a forwardly extending pulling position, means on the hitch member for engaging the ground in said normal position whereby the hitch member itself will act as a support for the implement, the said hitch member having means forming a sled runner shaped surface for engagement by the said draft coupling, and said surface having a straight portion standing in a substantially upright position in the normal position of the hitch member and above the level of the said pivot whereby engagement of the draft coupling and a forward pull thereon will pull out the hitch member to its pulling position, and said surface terminating in an upwardly curving portion at its forward end in the pulling position whereby reversed movement of the draft coupling will swing the hitch member back to its normal position, and the said mounting member having means for engaging opposite portions of the hitch member and stopping it in its respective normal and pulling positions.

8. A hitch mechanism for connecting a tractor draw bar coupling to an implement tongue, comprising in combination, a bracket secured to the tongue, a hitch member pivoted to the bracket and supported for swinging movements with respect to the implement from a starting position at which it inclines upwardly and rearwardly to a forwardly extending operative position, a foot plate on one end of the hitch member for engaging the ground in said starting position to thereby support the implement tongue, the said hitch member having a coupling engaging leg which in the operative position of the member extends forwardly and curves upwardly whereby rearward movement of the coupling along the curve will urge the forward end of the member upwardly to return it to starting position, and a latch means on the bracket operative to engage the hitch member and releasably hold it in its operative position.

JERRY J. RAVERS, Jr.

REFERENCES CITED

The following references are of record in the file of this patent:

UNITED STATES PATENTS

| Number | Name | Date |
| --- | --- | --- |
| 1,226,687 | Mowry | May 22, 1917 |
| 1,504,244 | Howell | Aug. 12, 1924 |
| 1,546,984 | Howell | July 21, 1925 |
| 2,225,157 | Court | Dec. 17, 1940 |
| 2,230,801 | Jager | Feb. 4, 1941 |
| 2,256,310 | Braley et al. | Sept. 16, 1941 |
| 2,269,023 | Hendricks | Jan. 6, 1942 |
| 2,328,850 | Sensenig | Sept. 7, 1943 |
| 2,388,923 | Masters | Nov. 13, 1945 |

FOREIGN PATENTS

| Number | Country | Date |
| --- | --- | --- |
| 596,542 | Great Britain | Jan. 6, 1948 |